UNITED STATES PATENT OFFICE.

WILLIAM R. WALKER, OF NEW YORK, N. Y.

MANUFACTURE OF STEEL.

13,861. Specification of Reissued Letters Patent. Reissued Jan. 5, 1915.

No Drawing. Original No. 1,014,425, dated January 9, 1912, Serial No. 502,865. Reissue No. 13,538, dated February 25, 1913, Serial No. 739,414. This application for reissue filed October 9, 1914. Serial No. 865,974.

*To all whom it may concern:*

Be it known that I, WILLIAM R. WALKER, a citizen of the United States, residing in the city, county, and State of New York, have invented an Improvement in the Manufacture of Steel, of which the following is a specification.

In the practice of my invention, I introduce molten pig metal into a Bessemer converter and blow it therein until the silicon and incidentally a large proportion of any manganese which may be in it has been eliminated and the carbon reduced to a definite percentage, preferably to about .05 per cent., which percentage can be gaged with accuracy because it is about the percentage contained in the metal at the time when the flame "drops", a phenomenon which is well known and readily recognized by the skilled blower. I then add to the desiliconized and substantially decarburized metal a proportion of carbon sufficient to raise its carbon content to a definite percentage, preferably to about .3 per cent., though this percentage may be varied. The carbon addition is preferably made by adding to the Bessemer metal in the ladle pig iron either in the form of cold pig or molten pig, and as the percentage of carbon of the Bessemer metal is substantially constant, the amount of pig metal to be added in the ladle can be readily determined with substantial precision. The carbon may be introduced by adding anthracite coal or powdered coke to the metal instead of adding carbon in the form of pig iron. If pig iron is added, it is preferably in the molten condition. The metal is thus enriched in carbon to about the same percentage as steel. It is also deoxidized by means of the added carbon and, where pig iron is used for recarburizing, by means of the manganese and silicon in the pig iron, being in fact substantially steel containing an excess of phosphorus, sulfur or the like such as are commonly removed in refining furnaces of the electric type or of the open hearth or other suitable type. For example, the recarburized metal may be charged into an electrically heated furnace where it is treated preferably with basic additions for removal of sulfur and phosphorus, and for increase of its heat to bring it into the refined and heated condition proper for casting into the ingot molds.

The importance of adding carbon to the blown metal before introducing it into the refining furnace is that in this way the loss by skulling is lessened, and by bringing the metal to a definite carbon content the heats in the refining furnace are made uniform in character and duration, the product rendered more uniform and the manufacture greatly facilitated.

The importance of adding pig iron to the blown metal or introducing it into the refining furnace is that in this way the oxids, the presence of which largely determine the difference between unrefined molten metal and finished steel, are eliminated by whatever deoxidizing agents may be present.

As the decarburized metal is low in carbon when taken from the converter and is often transferred a considerable distance to the refining furnace, a considerable amount of this metal will solidify in the ladle and form skulls therein. This skulling action will reduce the amount of metal poured into the refining furnace from the ladle, and as the skulling action will vary, the amount poured in will vary. By adding carbon to the metal before its being carried to the refining furnace, I raise its carbon content and thus lower its melting point, and hence prevent or greatly lessen the amount of skulling during the transfer to the refining furnace. This, therefore, makes the charges more uniform in amount as poured into the refining furnace.

The obtaining of a uniform carbon content is rendered easy by adding carbon to the blown metal rather than by attempting to stop the blow at the desired point, for to determine the point of stopping before the flame drops is very difficult, while to add the necessary percentage of carbon to the bath depleted of carbon is easy.

I am aware that it is old to eliminate practically all of the carbon in steel before recarburizing and do not desire to claim this, but I do desire to claim the recarburizing prior to transferring the metal to the refining furnace.

The best percentage of carbon to be added will be governed somewhat by the period of time during which the metal is to be held in the ladle before pouring into the refining furnace, being greater as the time is longer.

As above stated, pig iron is preferable to other recarburizing and deoxidizing means because some of the metalloids ordinarily contained therein, such as silicon for example, are more efficient than carbon at low temperatures. It is desirable to keep the temperature low, as this facilitates the extraction of phosphorus in the refining furnace. The recarburizing operation permits of supplying the metal at the desired low temperature because if the metal were not recarburized it would skull in the ladle except at high temperatures.

The invention may be applied not only in connection with electric furnaces, but with basis open-hearth furnaces and also with acid open-hearth furnaces; in fact, with practically any of the usual refining operations which are customarily varied in accordance with the raw material and the desired product. It is well known that in all these refining furnaces, which use scrap, pig iron and ore, better steel can be made by using a higher percentage of scrap; the scrap being steel already with oxids and other deleterious elements removed and being subjected to a further refinement in reusing it in a new charge. The blown metal recarburized as above described is as good as scrap steel because the oxids and other impurities have been eliminated therefrom with the sole exception that it still contains too high a percentage of phosphorus and sulfur to be good steel. As these elements are easily removed in the refining furnace the metal which is carried to the furnace by my process is nearly or as good as scrap steel. The result is a final product of uniform high quality. The process is much faster than the previous processes for making the same quality of steel.

It has heretofore been proposed, with a number of variations, to use first the Bessemer converter and then the open-hearth or other refining furnace. These processes being generally referred to as the duplex process, and it is well known that this process is extremely rapid, occupying only a small fraction of the time required for straight open-hearth or similar processes. But the product of these duplex processes is not generally believed to be as good as true open-hearth steel. The bessemerized metal used in the duplex processes contains so much oxid of iron and the removal of this oxid is so slow and difficult in the open-hearth, that the product is not of the first grade. By my method of recarburizing between the converter and the refining furnace the metal supplied to the refining furnace is so nearly free of oxid of iron as to result in a product of the highest grade. The refining furnace has practically nothing to do but to take out phosphorus and sulfur, the charge is at a low temperature which is most favorable for this operation and consequently the operation is very rapid.

The recarburizing may be done in the ladle between the converter and the refining furnace or it may be done in the converter after the blow has been stopped. Where pig iron is used it may be taken molten from a mixer, cupola or other source of supply. Enough carbon should be added, in the recarburizing operation, to make the metal boil when it is poured on or in the refining furnace, so as to mix the metal and shorten the time of heat, thus securing the desired operation with a minimum of iron ore or oxid of iron so as to keep the final product as free from oxids as possible.

In the duplex process the open hearth furnace usually has four or five times the containing capacity of the Bessemer converter. The slag-forming materials in the open hearth furnace which contain oxids are in excess for the first additions of bessemerized metal. To improve this condition and to give time for the carbon and other deoxidizers to better do their work of deoxidation, I prefer to have the vessel which transfers the Bessemer metal to the open-hearth furnace as nearly of the same capacity as the open-hearth furnace as possible. The transfer ladle may be held to receive several successive heats from the Bessemer converter or it may receive heats from several Bessemer converters blown simultaneously.

In the ordinary duplex process there is a certain loss of iron in the blowing operation. In my improved process, since not all the pig iron is blown, there is a saving of metal amounting to a substantial item. For this reason the process may be used on higher priced iron than was possible with former processes involving blowing operations.

What I claim is:—

1. In the manufacture of steel, the steps consisting of removing the carbon of pig iron to a substantially definite percentage, then recarburizing to a sufficient extent to lessen skulling during transfer, and then transferring the metal to and treating it in an electric furnace.

2. In the manufacture of steel, the steps consisting in bessemerizing pig iron, reducing its carbon to a substantially definite percentage, then adding carbon to a sufficient extent to lessen skulling during transfer, and then transferring the metal to and treating it in an electric furnace.

3. In the manufacture of steel, the steps consisting of bessemerizing pig iron to a point where the flame drops, then removing the metal from the converter, adding carbon thereto to a sufficient extent to lessen skulling during transfer, and transferring the metal to and treating it in an electric furnace.

4. In the manufacture of steel, the steps consisting of first bessemerizing pig iron, then carburizing the bessemerized metal and afterward refining the bessemerized metal in the usual way in a refining furnace.

5. In the manufacture of steel the steps consisting of bessemerizing pig iron to approximately a point where the flame drops, at which point the silicon and most of the carbon have been oxidized out and the metal contains iron oxid, recarburizing the bessemerized metal and thereby eliminating the major portion of the iron oxid and producing a metal which is substantially steel containing an excess of phosphorus, sulfur or the like, and then transferring the metal to and refining it in the usual way in a refining furnace to produce steel of the desired composition and quality.

6. In the manufacture of steel the steps which consist in first bessemerizing pig iron, recarburizing the bessemerized metal so as to lower its melting point and prevent skulling in the ladle, thereby also eliminating iron oxid and then transferring the metal to and refining it in the usual way in a refining furnace.

7. In the manufacture of steel, the steps consisting of first bessemerizing pig iron, then introducing pig iron into the bessemerized metal to recarburize the same and to eliminate iron oxid therefrom by means of the deoxidizing agents present in the pig iron and afterward refining the bessemerized metal in the usual way in a refining furnace.

In witness whereof, I have hereunto signed my name in the presence of two subscribing witnesses.

WILLIAM R. WALKER.

Witnesses:
GEO. C. HESSEL,
LULU STUBENVALL.